(12) United States Patent
Tsujino et al.

(10) Patent No.: US 6,903,776 B1
(45) Date of Patent: Jun. 7, 2005

(54) DIGITAL CAMERA

(75) Inventors: Kazuhiro Tsujino, Matsubara (JP); Junya Kaku, Itami (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/420,806

(22) Filed: Oct. 19, 1999

(30) Foreign Application Priority Data

Oct. 19, 1998 (JP) .......................................... 10-296666

(51) Int. Cl.⁷ .......................................... H04N 5/235
(52) U.S. Cl. .................... 348/362; 348/221.1
(58) Field of Search .......................... 348/220.1, 221.1, 348/222.2, 296, 297, 312, 362, 363, 364, 365, 366, 367; 386/96

(56) References Cited

U.S. PATENT DOCUMENTS

| 5,101,276 | A | * | 3/1992 | Ohta | 348/221.1 |
| 5,309,243 | A | * | 5/1994 | Tsai | 348/221.1 |
| 5,471,242 | A | * | 11/1995 | Kondo | 348/362 |
| 5,767,904 | A | * | 6/1998 | Miyake | 348/362 |
| 6,018,363 | A | * | 1/2000 | Horii | 348/220.1 |
| 6,327,423 | B1 | * | 12/2001 | Ejima et al. | 386/96 |

FOREIGN PATENT DOCUMENTS

| JP | 04-162881 | 6/1992 |
| JP | 10-191226 | 7/1998 |

* cited by examiner

*Primary Examiner*—Tuan Ho
*Assistant Examiner*—Luong T. Nguyen
(74) *Attorney, Agent, or Firm*—Westerman, Hattori, Daniels & Adrian, LLP

(57) ABSTRACT

A digital camera includes a timing generator. The timing generator reads shutter speed data out of a register in response to a vertical synchronizing signal outputted from a signal generator, and controls exposure by a CCD imager according to this shutter speed data. The data in the register is updated in predetermined timing based on a vertical synchronizing signal. As a result, continuous shots of a subject are performed with different exposures.

12 Claims, 15 Drawing Sheets

DIGITAL CAMERA

BACKGROUND OF THE INVENTION

1. Field of the Invention

This invention relates to digital cameras and, more particularly, to a digital camera adapted for taking pictures of a subject in a continuous manner while varying exposure therefor.

2. Description of the Prior Art

The function possessed by the silver-halide photographic cameras includes a continuous shot function to take pictures of a subject in a continuous fashion while varying exposure. Using this function, it is possible to take at least one picture of a subject with a best suited exposure. In the silver-halide photographic camera, image recording completes simultaneous with image exposure, making it possible to advance the timing of picture taking during continuous shot operation in proportion to increase in film feed rate.

In the digital camera, however, the processes of exposure by a CCD imager and transfer of pixel signals from the CCD imager each require a 1-frame period. Only these two processes needs a time of as long as a 2-frame period. Considering further an image recording time, signal processing for one shot would require a 2-frame period or longer. Thus, the digital camera has had a problem of delay in picture taking timing, as compared to the silver-halide photographic camera.

Meanwhile, the processes of exposure, data transfer and recording are dependent from one another. It can be considered that the picture taking timing is to be advanced if the signal processing of a preceding shot and that of a current shot be made in a time-overlap manner. In the continuous shot function, however, exposure must be changed for each shot. To achieve this, if the signal processes be overlapped in time one another, there is a fear that proper update of exposure is difficult resulting in poor operation in a continuous shot function.

SUMMARY OF THE INVENTION

It is therefore a primary object of the present invention to provide a digital camera which is advanced in timing of picture taking during continuous shot operation with an exposure properly updated.

According to the present invention, a digital camera for performing continuous shots of a subject with different exposures, comprises: a signal generator for generating a timing signal; a first register for holding exposure data; a timing generator for causing exposure according to exposure data held in the first register in response to the timing signal; an instruction key for instructing for performing continuous shots; and a processor for starting to count the timing signal in response to an instruction of the instruction key, and performing an update process to update the exposure data held in the first register in first predetermined timing.

The timing generator causes exposure according to exposure data held in the first register in response to a timing signal generated from the signal generator. If a continuous shot operation is instructed by the instruction key, the processor starts to count a timing signal and performs an update process to update the exposure data held in the first register in first predetermined timing.

According to the invention, because exposure data is updated in first predetermined timing based on a timing signal, it is possible to advance picture taking timing during a continuous shot operation and to update properly an exposure.

In one aspect of the invention, the timing generator controls a charge storage period on the image sensor according to the exposure data held in the first register.

In another aspect of the invention, when a continuous shot operation is instructed, the processor counts the timing signal and performs a record process to record shot image data obtained by the exposure in second predetermined timing.

In one embodiment of the invention, during the update process the first predetermined timing is detected based on the timing signal, and succeeding exposure data is set in the first register in the first predetermined timing. Current exposure data is retreated from the first register to a second register prior to setting the succeeding exposure data. On the other hand, during the recording process the second predetermined timing is detected based on the timing signal, and recorded are current shot image data obtained due to exposure according to the current exposure data and the current exposure data retreated in the second register in the second predetermined timing.

In another embodiment of the invention, the current shot image data is compressed. Within a recording medium, a current image file is created accommodating current compressed image data created by the compression process and the current exposure data.

The processor further performs a calculation process to calculate a current compression ratio based on a preceding compression ratio upon compressing preceding shot image data and a data size of preceding compressed image data, and a storing process to store current compression ratio data representative of the current compression ratio into a third register. The compression process performs compression on the current shot image data according to the current compression ratio data stored in the third register. Also, in the file creating process, the current compression ratio data stored in the third register is also accommodated in the current image file.

In another aspect of the invention, the processor performs an adjustment process of the exposure over a predetermined period after ending the continuous shots.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
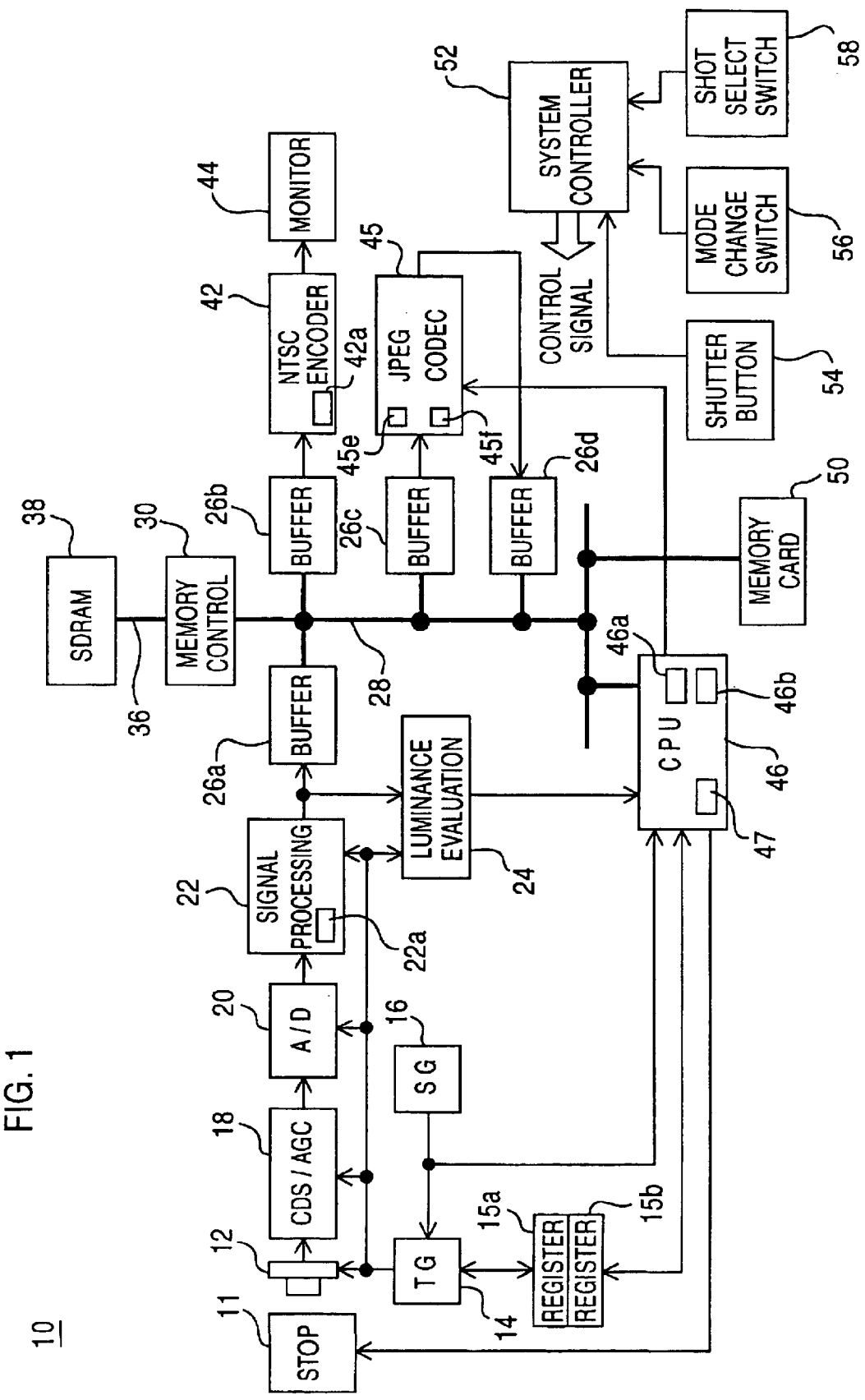
FIG. 1 is a block diagram showing one embodiment of the present invention.

Referring to FIG. 1, a digital camera 10 of this embodiment includes a CCD imager 12. The CCD imager 12 is mounted, at its front, a not-shown color filter. A subject image is taken through this color filter to the CCD imager 12.

If an operator manipulates a mode set switch 56 to a camera side, a system controller 52 sets for a camera mode. Then, the CPU 46 starts a signal generator (SG) 16 so that the signal generator (SG) 16 outputs a horizontal synchronizing signal and vertical synchronizing signal. The TG14 reads shutter speed data out of a register 15a in response to a vertical synchronizing signal, and controls an exposure in accordance with the shutter speed data. That is, the TG14 controls a charge storage period on the CCD imager 12 by so-called an electronic shutter scheme. The TG14 also carries out vertical and horizontal transfer of charges in a progressive scan scheme, thereby reading a progressively scanned camera signal out of the CCD imager 12. The vertical synchronizing signal is created at an interval of 1/30th of a second. As a result, camera signals for each frame are outputted from the CCD imager 12 every 1/30th of a second.

It is noted that the CCD imager 12 in this embodiment can carry out, in a same frame period, transfer of the pixels obtained in a preceding frame and exposure to be effected for a current frame.

The camera signals outputted from the CCD imager 12 have any one of color components for each pixel. The camera signals thus configured are subjected to well-known noise removal and level adjustment by a CDS/AGC circuit 18 and then converted into camera data as a digital signal by an A/D converter 20. A signal processing circuit 22 performs YUV conversion with a ratio of 4:2:2 on the camera data outputted from the A/D converter 20, thus creating YUV data.

A luminance evaluation circuit 24 fetches only Y data from among the created YUV data, and evaluates a luminance of a subject based on centrally weighted photometry. The luminance evaluation value is inputted to the CPU 46. The CPU 46, in turn, calculates a shutter speed for an optimal exposure based on the luminance evaluation value, and writes corresponding shutter speed data to the register 15a. The above process is performed on a each-frame basis, updating a shutter speed to an optimal value.

Incidentally, the TG 14 also controls the operation timing of the CDS/AGC circuit 18, the A/D converter 20, the signal processing circuit 22 and the luminance evaluation circuit 24.

The YUV data outputted from the signal processing circuit 22 is supplied also to a buffer 26a. The buffer 26a is configured by a dual-port SRAM to have a capacity corresponding to 28-pixels of YUV data. The write operation to the buffer 26a is performed by a buffer write circuit 22a provided in the signal processing circuit 22.

The YUV data written on the buffer 26a, before overwritten by the following YUV data, is read out by the memory control circuit 30. The memory control circuit 30 fetches the YUV data thus read through a bus 28, and thereafter writes it to an SDRAM 38 through a bus 36. The clock rate for reading data from the buffer 26a is set 4 times a clock rate for writing data onto the buffer 26a. Consequently, the buses 28 and 36 are occupied, over a duration of ¼th of the total time, in transferring YUV data from the buffer 26a to the SDRAM 38 over a duration of ¼th of the total time.

The operation of access to the SDRAM 38 will be explained in detail with reference to FIG. 2. The signal processing circuit 22 includes a read request generating circuit 22b to issue a read request in predetermined timing. Meanwhile, an NTSC encoder 42 includes a write request generating circuit 42b to issue a request in predetermined timing. Such requests are outputted from a JPEG CODEC 45 and CPU 46. When a plurality of requests are inputted to a mediation circuit 30a, the mediation circuit 30a mediates between the requests and sends a start signal corresponding to any request to a processing circuit 30b.

During outputting through-images, the CPU 46 supplies a high level gate signals to AND circuits 22c and 42c. This causes the gates to open so that the mediation circuit 30a can be inputted by a read request from the signal processing circuit 22 and a write request from the NTSC encoder 42.

To process for a read request from the signal processing circuit 22, the processing circuit 30b supplies an address signal to the buffer 26a in response to a start signal thereby reading YUV data out of the buffer 26a. The read YUV data is written to the SRAM 38 through the bus 36. Each time 64-pixels of YUV data has been written, the processing circuit 30b outputs an end signal to the mediation circuit 30a thereby releasing open the buses 28 and 36. The mediation circuit 30a then enters into processing for a next request. In this manner, a plurality of read requests sent from the signal processing circuit 22 are processed, thereby writing 1 frame of YUV data to the SDRAM 38 for 1/30th of a second.

To process a write request from the NTSC encoder 42, the processing circuit 30b reads YUV data out of the SDRAM 38 and writes it to the buffer 26b. The processing circuit 30b issues an end signal when 64 pixels of YUV data have been read out, similarly to the above. Such a process is repeated, thereby reading 1 frame of YUV data out of the SDRAM 38 for 1/30th of a second. Incidentally, also the buffer 26b is configured by a dual-port SRAM to have a capacity to store 8 pixels of YUV data.

The NTSC encoder 42 is provided therein with a buffer read circuit 42a. The buffer read circuit 42a reads out YUV data stored in the buffer 26b at a clock rate of ¼ times that upon writing. Furthermore, the read YUV data is encoded with an NTSC format. The encoded data is converted into an analog signal by a not-shown D/A converter and outputted to a monitor 44. As a result, through-images are displayed on the monitor 44.

When outputting through-images as mentioned above, the YUV data is accessed to the buffer 26a, 26b or the SDRAM 38 through DMA. That is, the CPU 46 does not be involved in image data processing except for the case that it starts the SG16 upon setting a camera mode, supplies a predetermined level of control signals to the signal processing circuit 22 and NTSC encoder 42 and updates shutter speed data in predetermined timing.

If the operator operates a shot select switch 58, any one will be selected of a one-shot mode and a continuous shot mode. The one-shot mode is to take only one picture each time a shutter button 54 is depressed. The continuous shot mode is to perform continuous seven shots each time the shutter button 54 is depressed.

Figure 2:
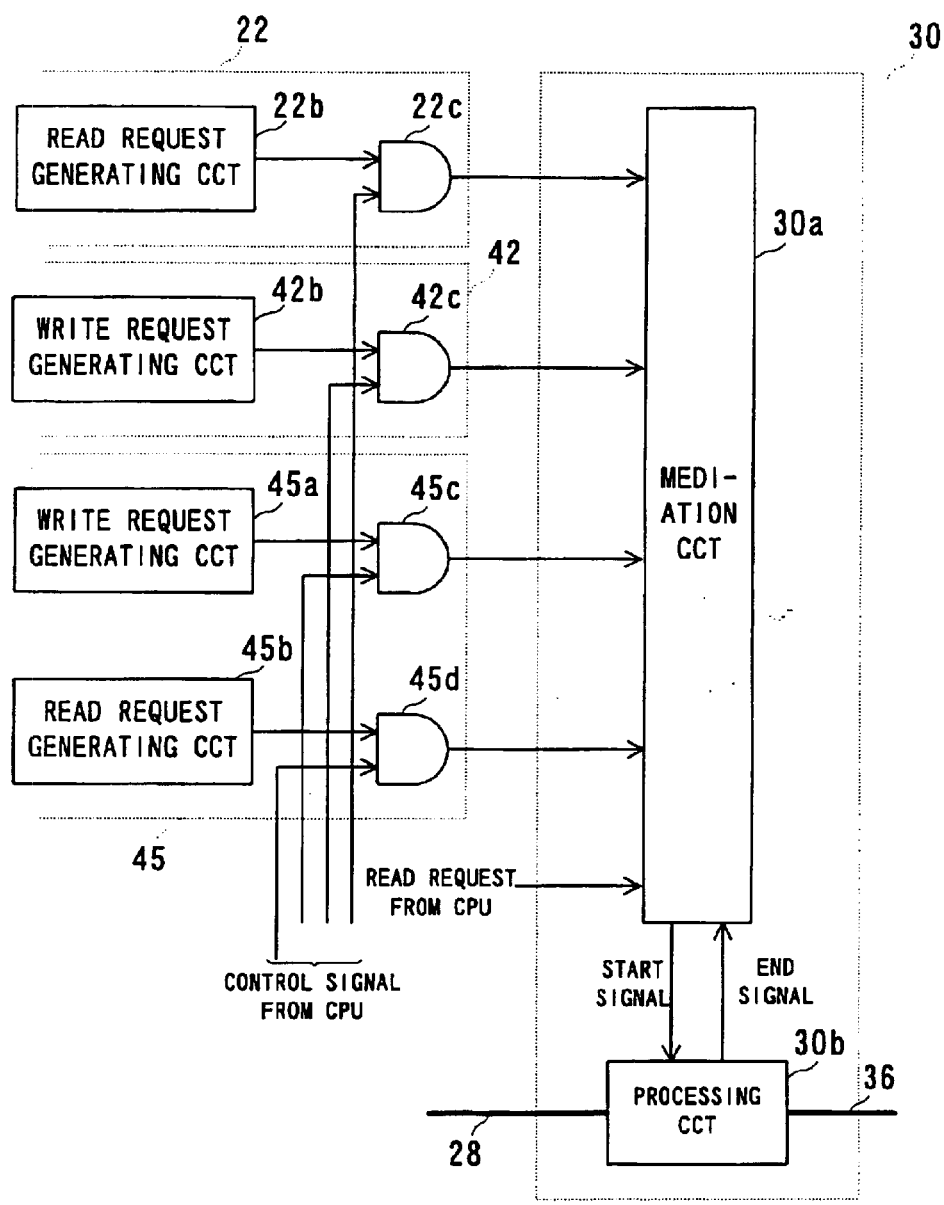
FIG. 2 is a block diagram showing one part of the FIG. 1 embodiment.
Figure 3:
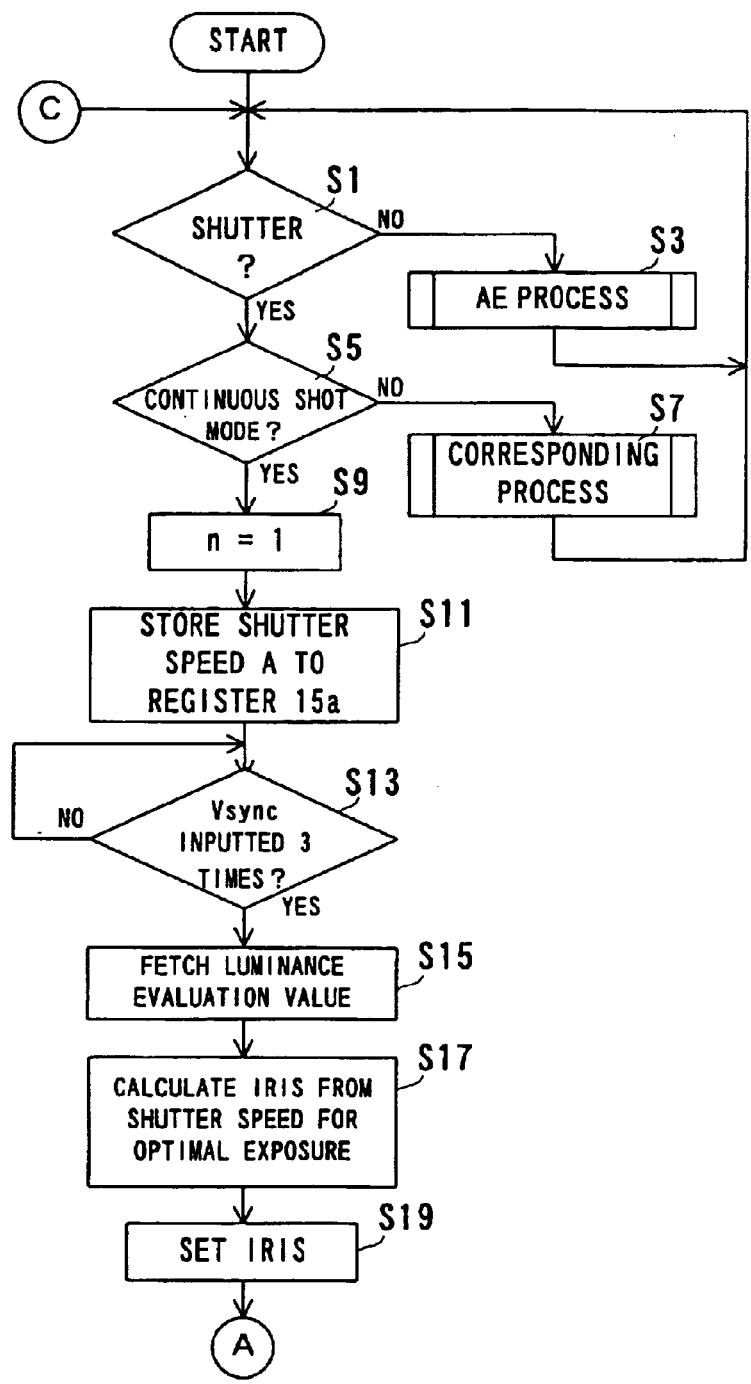
FIG. 3 is a flowchart showing one part of operation of the FIG. 1 embodiment.
Figure 4:
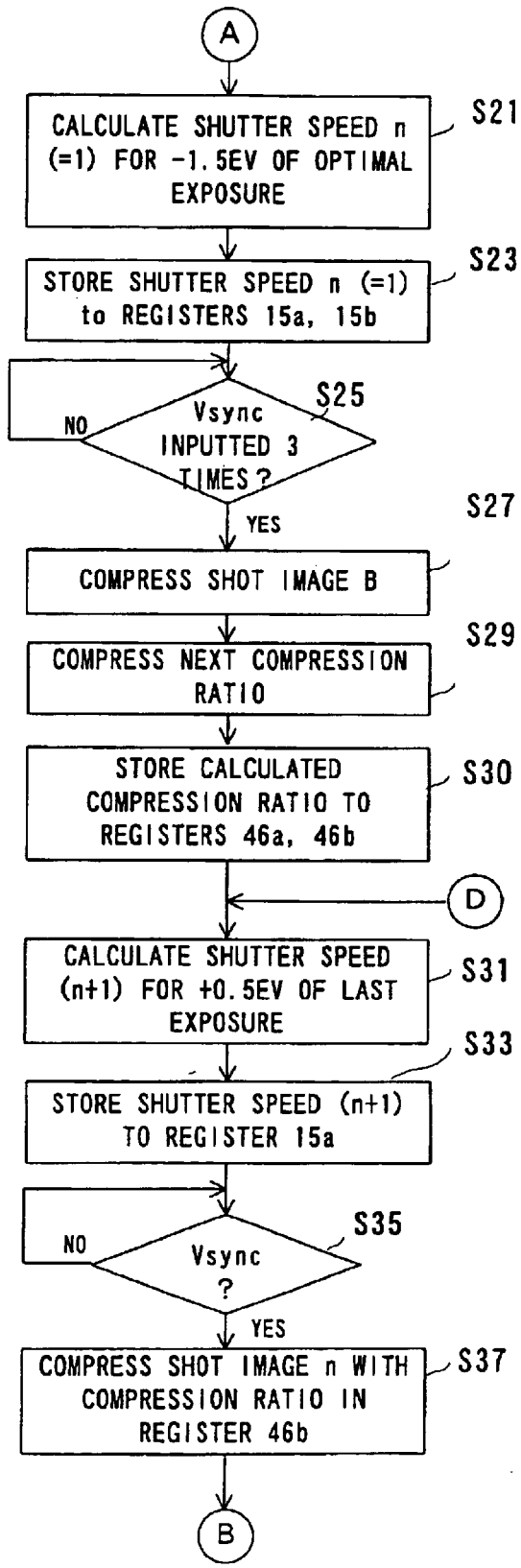
FIG. 4 is a flowchart showing another part of operation in the FIG. 1 embodiment.

If the operator selects a one-shot mode and then depresses the shutter button 54, the CPU 46 reduces to a low level a write signal to be supplied to the AND circuit 42c shown in FIG. 2, thereby applying gating to a write request. As a result, YUV data is suspended from being read out of the SDRAM 38. The signal processing circuit 22 remains outputting YUV data, and continues writing it to the SDRAM 38.

The CPU 46 fetches a luminance evaluation value outputted from the luminance evaluation circuit 24 after operating the shutter button 54, and calculates an optimal shutter speed and iris from this luminance evaluation value. The optimal shutter speed data is written to the register 15a, and at the same time an aperture stop unit 11 is changed in lens opening according to optimal iris data. When 1-frame YUV data created after setting the optimal shutter speed and iris have been written to the SDRAM 38, the CPU 46 reduces to a low level a gate signal to be sent to the AND circuit 22c shown in FIG. 2. This applies gating for a read request, suspending the write operation to the SDRAM 38.

In this manner, the YUV data stored in the SDRAM 38 is recorded onto a memory card 50 through JPEG compression explained below. It is noted that the YUV data to be subjected to a record process is defined as shot image data for convenience of explanation.

Referring to FIG. 2, the CPU 46 inputs a high level gate signal to AND circuits 45c and 45d provided in the JPEG CODEC 45. Due to this, the write request generating circuit 45a and read request generating circuit 45b outputs in predetermined timing requests to be supplied to the mediation circuit 30a through the AND circuits 45c and 45d. The mediation circuit 30a mediates between the requests and inputs a predetermined start signal to the processing circuit 30b.

During processing a write request, the processing circuit 30b reads shot image data from the SDRAM 38 and writes it to the buffer 26c through the bus 28. The shot image data written on the buffer 26c is read out by a buffer read circuit 45e provided in the JPEG CODEC 45, and then subjected to JPEG compression. The compressed image data is thereafter stored in a buffer 26d by a buffer write circuit 45f. The processing circuit 30b reads the compressed image data from the buffer 26b in response to a read request sent from the JPEG CODEC 45. The read compressed image data is again written to the SDRAM 38. This process is repeated with a result that compressed image data having been compressed of the shot image data is obtained within the SDRAM 38. Incidentally, each of the buffers 26c and 26d is also configured by a dual-port SRAM capable of storing 128-pixels of YUV data.

The CPU 46, when completing the writing of the compressed image data to the SDRAM 38, sends a read request to the mediation circuit 30a. In response to this, the compressed image data is read out of SDRAM 38. The CPU 46 accommodates the read compressed image data, together with the shutter speed data upon picture taking and the compression ratio data upon compression, into an image file and records this image file in the memory card 50. In this manner, the shot image is completed of recording. Incidentally, the shutter speed data was accommodated in the image file because of a requirement to meet exif as one of the digital camera standards.

As will be understood from the above explanations, the shot image data is also written to the SDRAM 38 through DMA, and subjected to JPEG compression. The CPU 46 is not involved in shot image data processing except for the cases that it updates a shutter speed and iris in advance of picture taking, supplies a predetermined level of control signals to the signal processing circuit 22, JPEG CODEC 45 and NTSC encoder 42, and records the compressed image data stored to the SDRAM 38 to the memory card 50.

Where the operator has selected a continuous shot mode, seven shots can be made with different exposures to create seven frames of shot image data. The respective ones of shot image data are accommodated into an image file through JPEG compression, and the image file is further recorded in the memory card 50. Each picture taking process (from exposure to recording) requires a 3-frame period. That is, exposure needs a 1-frame period, transfer (writing to the SDRAM 38) a 1-frame period, and recording process including compression a 1-frame period. However, if the present-time picture taking process be started after completing a last-time picture taking process, a continuous shot operation will take a long time.

To avoid this, this embodiment implement in a same frame a process to record a last-time shot image and a process to effect exposure for a present-time shot image, thereby advancing the timing of picture taking. Also, the shutter speed data stored in the register 15a is updated in predetermined timing due to a necessity of changing an exposure for each of shot images. Furthermore, in order to write a shot image and shutter speed data related to each other into a same image file, the shutter speed data after completing exposure is kept in another register 15b.

In the camera mode, the CPU 46 processes a routine shown in FIG. 3 to FIG. 7. First, in step S1 it is determined whether the shutter button 54 was depressed or not. If "NO" here, in step S3 is processed a subroutine of an AE process shown in FIG. 7, and the process returns to the step S1. Due to this, automatic adjustment on shutter speed is made during outputting through-images. If the shutter button 54 is depressed, the CPU 46 in step S1 determines "YES", and determines in the next step S5 whether the current mode is a one-shot mode or continuous shot mode. If a one-shot mode, then in step S7 a corresponding process is performed and the process returns to the step S1. If a continuous shot mode, the process proceeds to step S9.

In step S9 a count value of a counter 47 is set to "1". Next, in step S11, shutter speed data A (=initial value) is stored to the register 15a. Thereafter, in step S13 it is determined whether a vertical synchronizing signal has been inputted three times or not. If "YES", in step S15 a luminance evaluation value is fetched from the luminance evaluation circuit 24. That is, as will be understood from FIG. 8, after setting the shutter speed data A, exposure A with that shutter speed requires a 1-frame period and transfer of the obtained shot image A needs a 1-frame period. Within this duration, a vertical synchronizing signal occurs three times, and thereafter a luminance evaluation value corresponding to the shutter speed A is obtained. Consequently, a luminance evaluation value is fetched after a determination of "YES" in step S13.

Figure 8:
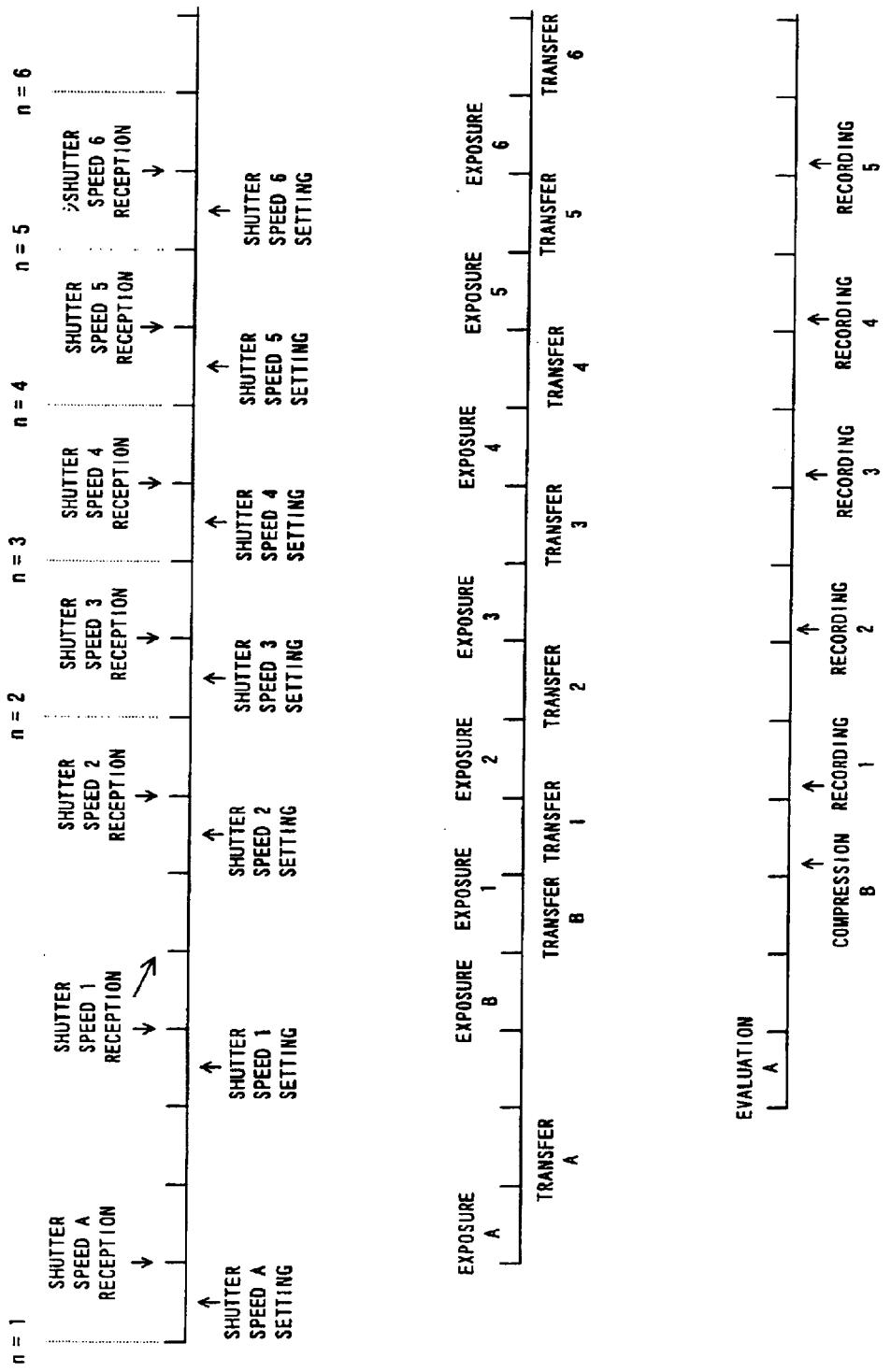
FIG. 8 is a timing chart showing one part of operation in the FIG. 1 embodiment.

The CPU 46 in step S17 calculates a shutter speed and iris for an optimal exposure based on the luminance evaluation value, and in step S19 sets the calculated iris to the aperture stop unit 11. The CPU 46 in step S21 also calculates a shutter speed n (=1) for −1.5 EV of the optimal exposure, and in step S23 stores the shutter speed data n to the registers 15a and 15b. Thereafter, inputted by a vertical synchronizing signal three times, the CPU 46 in step S25 determines "YES" and the process proceeds to step S27. While the vertical synchronizing signal is inputted three times, exposure B with a shutter speed 1 and transfer of the obtained shot image data B (transfer B) are performed as shown in FIG. 8. Thus, the shot image data B is stored into the SDRAM 38.

Consequently, the CPU 46 in step S27 instructs the JPEG CODEC 45 to perform a compression process the initial value Xb. The JPEG CODEC 45, in turn, requests the memory control circuit 30 to read out shot image data B and performs a compression process on the shot image data B with the initial value Xb. The JPEG CODEC 45 also requests the memory control circuit 30 to write the compressed image data B. As a result, the compressed image data B is written to the SDRAM 38. The CPU 46 subsequently proceeds to step S29 to request the memory control circuit 30 to read out the compressed image data B, detect a size Yb of the read compressed data B, and calculates a next-time compression ratio X1 based on the size Yb, initial value Xb and target size Z. Specifically, Equation 1 is calculated. Thereafter, in step S30 the calculated compression ratio X1 is stored to the registers 46a and 46b.

$$(Yb/Z) \times Xb = X1 \quad \text{[Equation 1]}$$

In step S31, calculated is a shutter speed (n+1) for +0.5 EV of the last-time exposure. Then in step S33 this shutter speed data (n+1) is stored to the register 15a. After a vertical synchronizing signal has been inputted once, the process moves to step S37 where a compression process is made on the shot image data n. As will be understood from FIG. 8, the writing of the shot image data n to the SDRAM 38 is made in a same frame as that of setting the shutter speed (n+1). At a time point of determination "YES" in step S35, the shot image data n is secured in the SDRAM 38. That is, the shot image data n is specified. The CPU 46 in step S37 performs a compression process on the shot image data n stored in the SDRAM 38. At this time, the JPEG CODEC 45 is given the compression ratio Xn stored in the register 46b. Incidentally, "n" of "Xn" corresponds to the count value n, and shot image data 1 will be compressed with the above compression ratio X1.

Obtaining compressed image data n by the process of step S37, the CPU 46 in step S39 detects a size n of the compressed image data n and calculates a next-time compression ratio X(n+1) according to Equation 2. The calculated compression ratio X(n+1) is stored in step S40 to the register 46a.

$$(Yn/Z) \times Xn = X(n+1) \quad \text{[Equation 2]}$$

Figure 6:
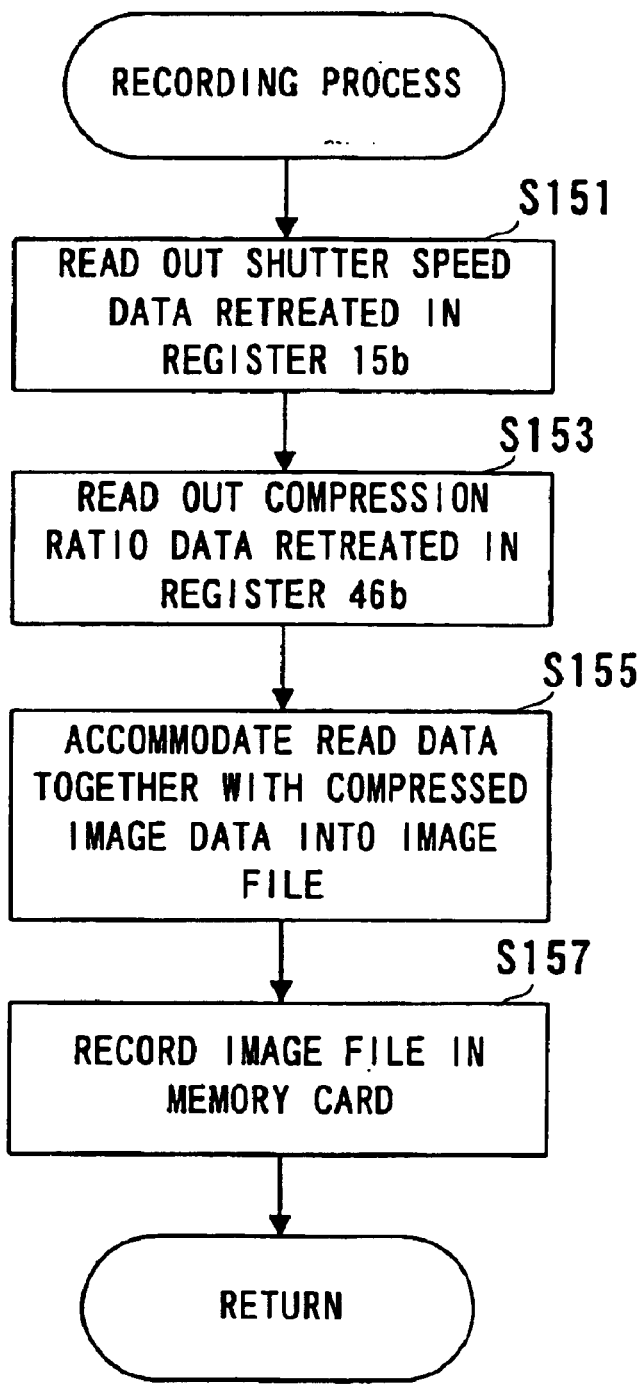
FIG. 6 is a flowchart showing further part of operation in the FIG. 1 embodiment.

The CPU 46 thereafter in step S41 processes a subroutine shown in FIG. 6, to record into the memory card 50 the compression image data n together with the shutter speed data stored in the register 15b and compression ratio data stored in register 46b. That is, in respective steps S151 and S153, shutter speed data and compression ratio data are read out of the registers 15b and 46b. Then, in step S155 the respective ones of the read data are accommodated together with the compressed image data n into an image file n. Then in step S157 the image file n is recorded onto the memory card 50. In this manner, an image file accommodating therein shutter speed data, compression ratio data and compressed image data is created within the memory card 50.

Referring back to FIG. 5, in step S43 the shutter speed data of the register 15a is retreated in the register 15b, and in step S44 the compression ratio data of the register 46a is retreated in the register 46b. If a vertical synchronizing signal is inputted once, then in step S45 it is determined whether a count value n is equal to "7" or not. If "YES" here, the process proceeds to step S49. However, if "NO", in step S51 the count value n is incremented and then the process returns to the step S31. As a result, the process of the steps S31–S51 is repeated until "YES" is determined in step S45.

As will be understood from FIG. 8, in a frame next to that having recorded a preceding shot image (e.g. recording 3), a shutter speed for a succeeding shot image (shutter speed 5) is set in the register 15a and a current shot image is transferred (transfer 4). In the next frame, recorded is the current shot image (recording 4) and exposure is made for a succeeding shot image (exposure 5). The shutter speed data for the succeeding shot image set in the register 15a (shutter speed 5) transferred in the next frame to the register 15b and written, 2-frame later, to an image file. That is, simultaneously with recording the succeeding shot image (shot image 5), a related shutter speed is recorded.

Also, the compression ratio data (X4) calculated upon compressing a preceding shot image (e.g. shot image 3) is stored to the register 46a. After the preceding shot image has been recorded, the compression ratio data (X4) in the register 46a is transferred to the register 46b. Then, during recording a current shot image (shot image 4), a compression process is executed with the compression ratio data (X4) stored in the RAM 46b. Because the change of an exposure changes the data amount of shot image data, if the compression ratio is constant at all times, the data amount of compressed image data also changes. In order to suppress such data amount variation, a compression ratio for the current shot image data is calculated based on a size of the preceding compressed image data, the preceding compression ratio and a target size.

If a shot image recording process has been made seven times, the CPU 46 in step S47 determines "YES". Then, the CPU 46 in step S49 returns the shutter speed to a value at which an optimal exposure is obtained. That is, the data in the register 15a is updated to optimal shutter speed data. After elapsing 2 frames from setting the optimal shutter speed, shot image data corresponding this optimal shutter speed is obtained within the SDRAM 38. Due to this, the CPU 46 after inputted by a vertical synchronizing signal twice proceeds from step S53 to step S55 to perform a similar AE process to the step S3. In step S57 it is determined whether a predetermined period (e.g. a 5-frame period) has elapsed or not. If "NO", the process returns to the step S55, whereas if "YES", the process returns to the step S1.

Although in the step S49 the optimal shutter speed is set, this shutter speed is a speed that have calculated in the step S17 immediately before starting the continuous shot operation. That is, at the end of the continuous shot operation, the subject would have changed. There is a possibility that the shutter speed is no longer optimal for the current subject. Consequently, a similar AE process is conducted after completing the continuous shot operation, disabling the shutter button 54 until a predetermined time has elapsed. As a result, a correct luminance evaluation value can be obtained for the picture taking in the next time. Furthermore, accurately calculated are a shutter speed and iris for attaining an optimal exposure.

Figure 7:
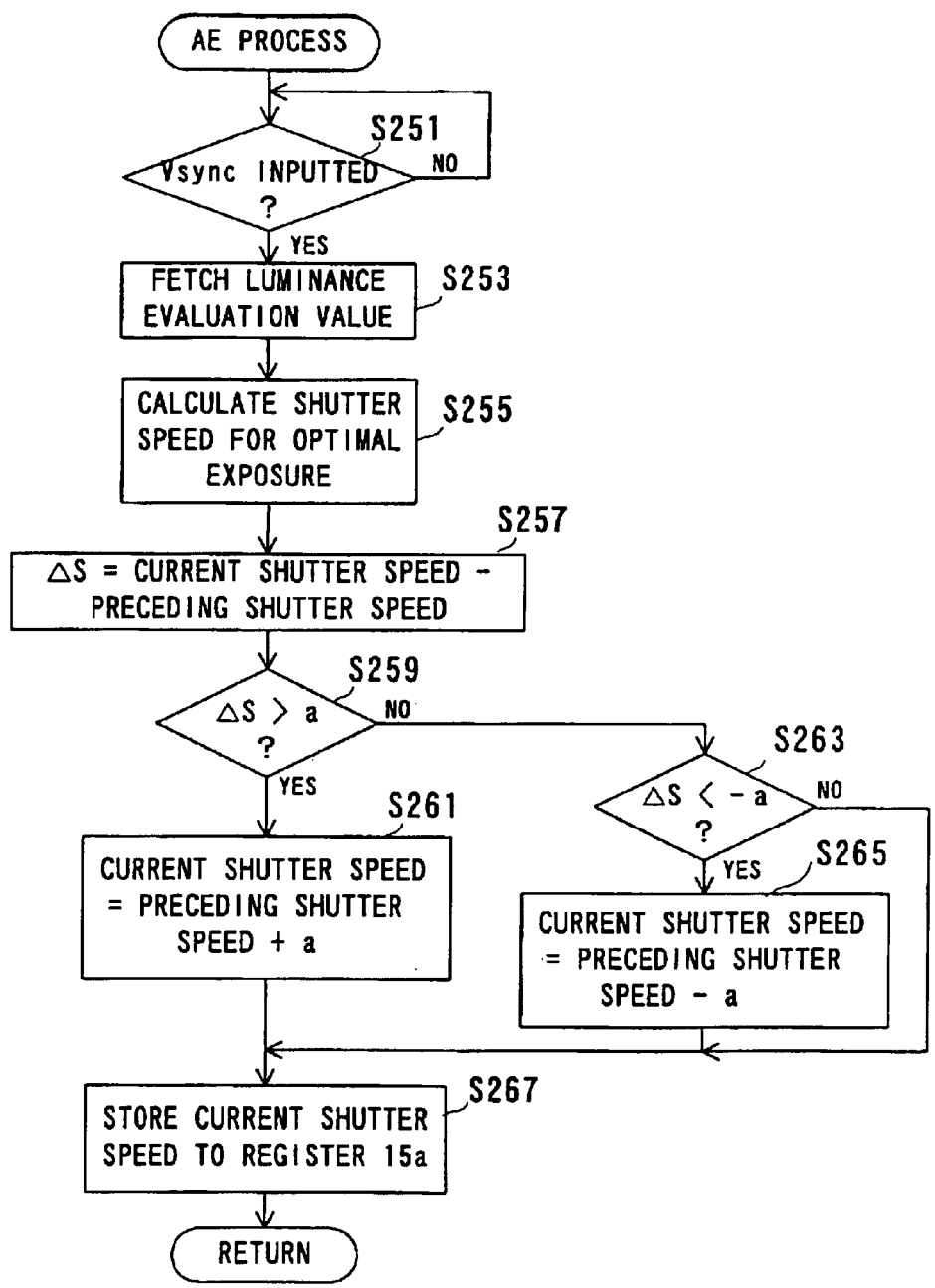
FIG. 7 is a flowchart showing another part of operation in the FIG. 1 embodiment.

Referring to FIG. 7, the AE process will be explained in greater detail. The CPU 46 in step S251 first determines whether a vertical synchronizing signal has been inputted 5 or not. If "YES", in step S253 a luminance evaluation value is fetched, and in step S255 calculated is a shutter speed for an optimal exposure. Then, in step S257 the preceding shutter speed is subtracted from the calculated current shutter speed to determine a difference S between them. Thereafter, in steps S259 and S263 the difference S is compared with a predetermined values a and −a. If S>a, then in step S261 the preceding shutter speed is added by the by the predetermined value a to obtain a value to be rendered as a current shutter speed. If S<−a, in step S263 the predetermined value a is subtracted from the preceding shutter speed to obtain a value to be rendered as a current shutter speed. On the other hand, if "NO", in both the steps S259 and S263, the current shutter speed is not changed. Thereafter, in step S267 the current shutter speed is stored in the register 15a, and the process returns. In this manner, the shutter speed is brought to an optimal value at all times.

Figure 9:
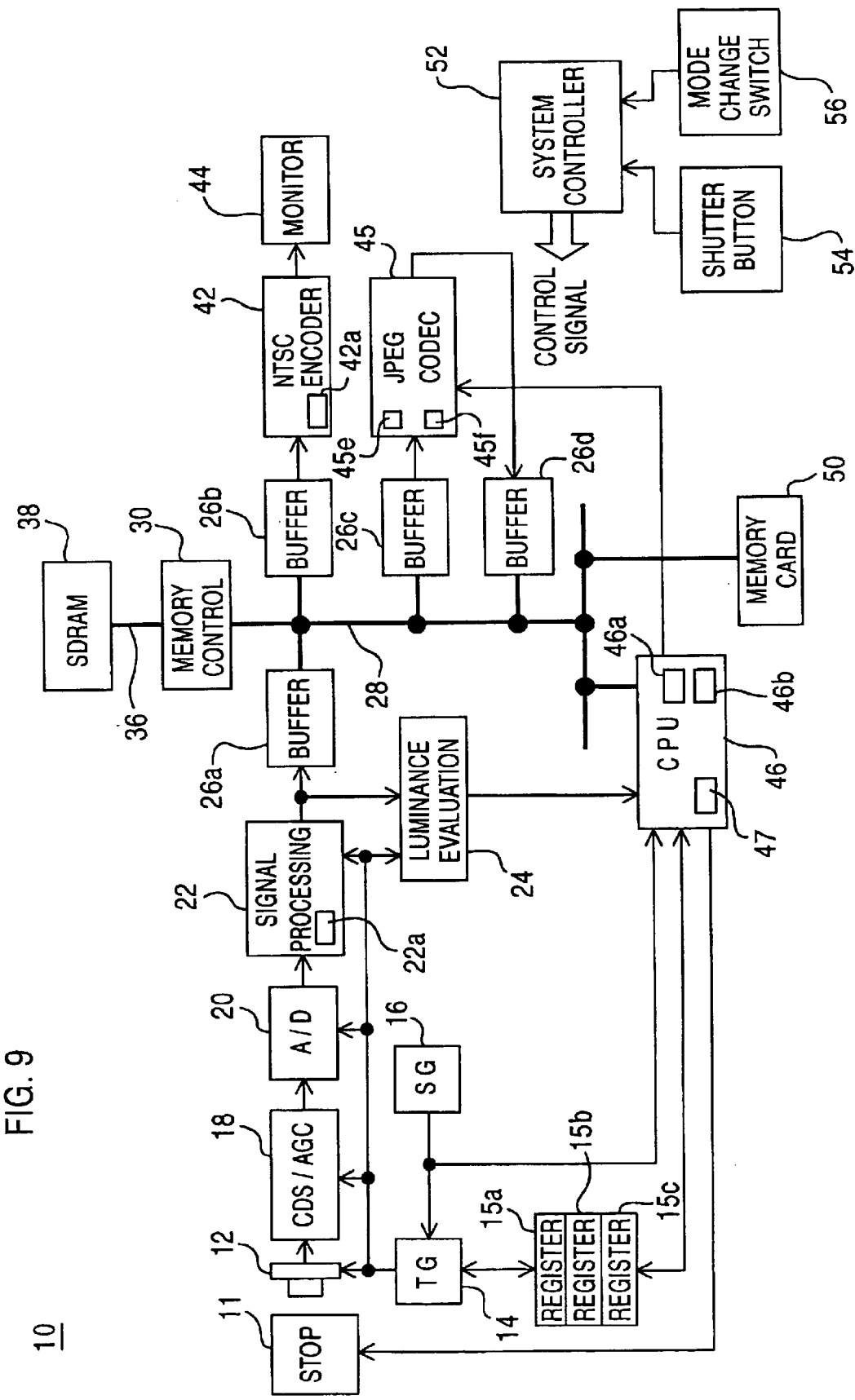
FIG. 9 is a block diagram showing another embodiment of the present invention.
Figure 10:
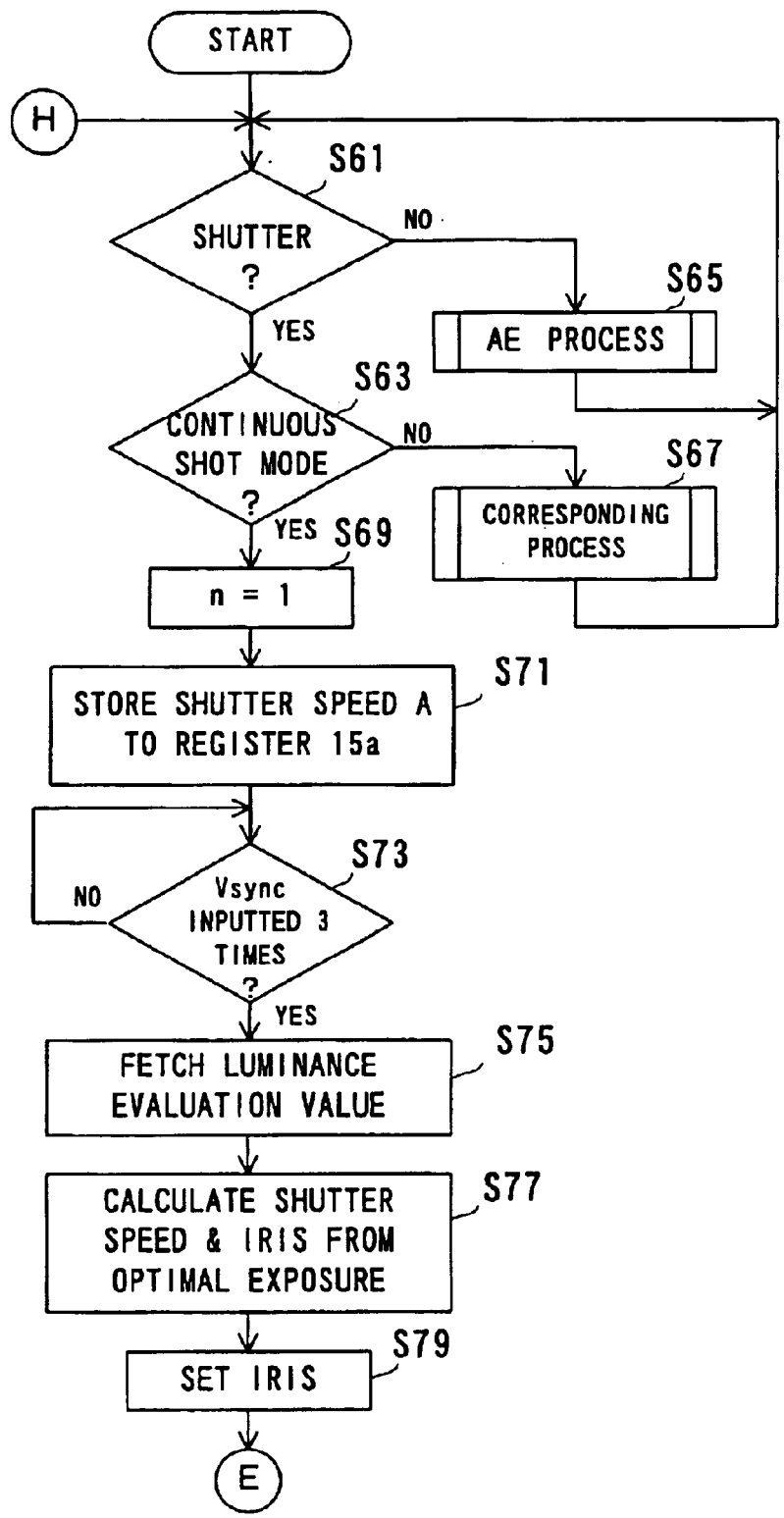
FIG. 10 is a flowchart showing one part of operation in the FIG. 9 embodiment.
Figure 11:
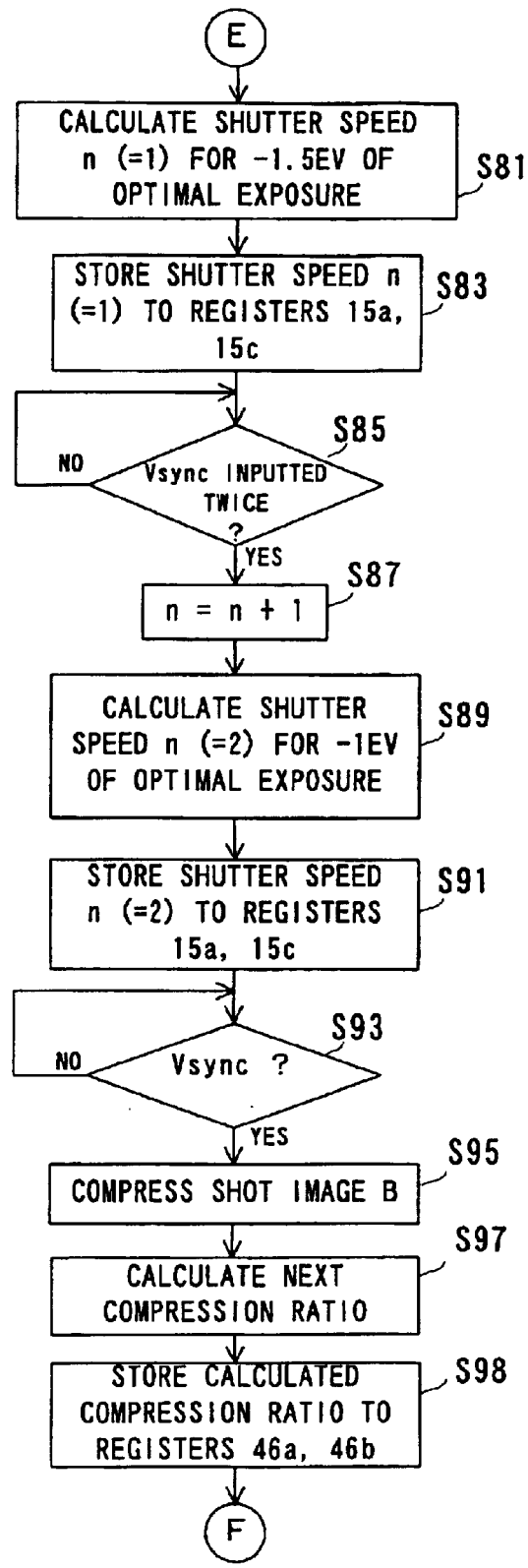
FIG. 11 is a flowchart showing another part of operation in the FIG. 1 embodiment.
Figure 12:
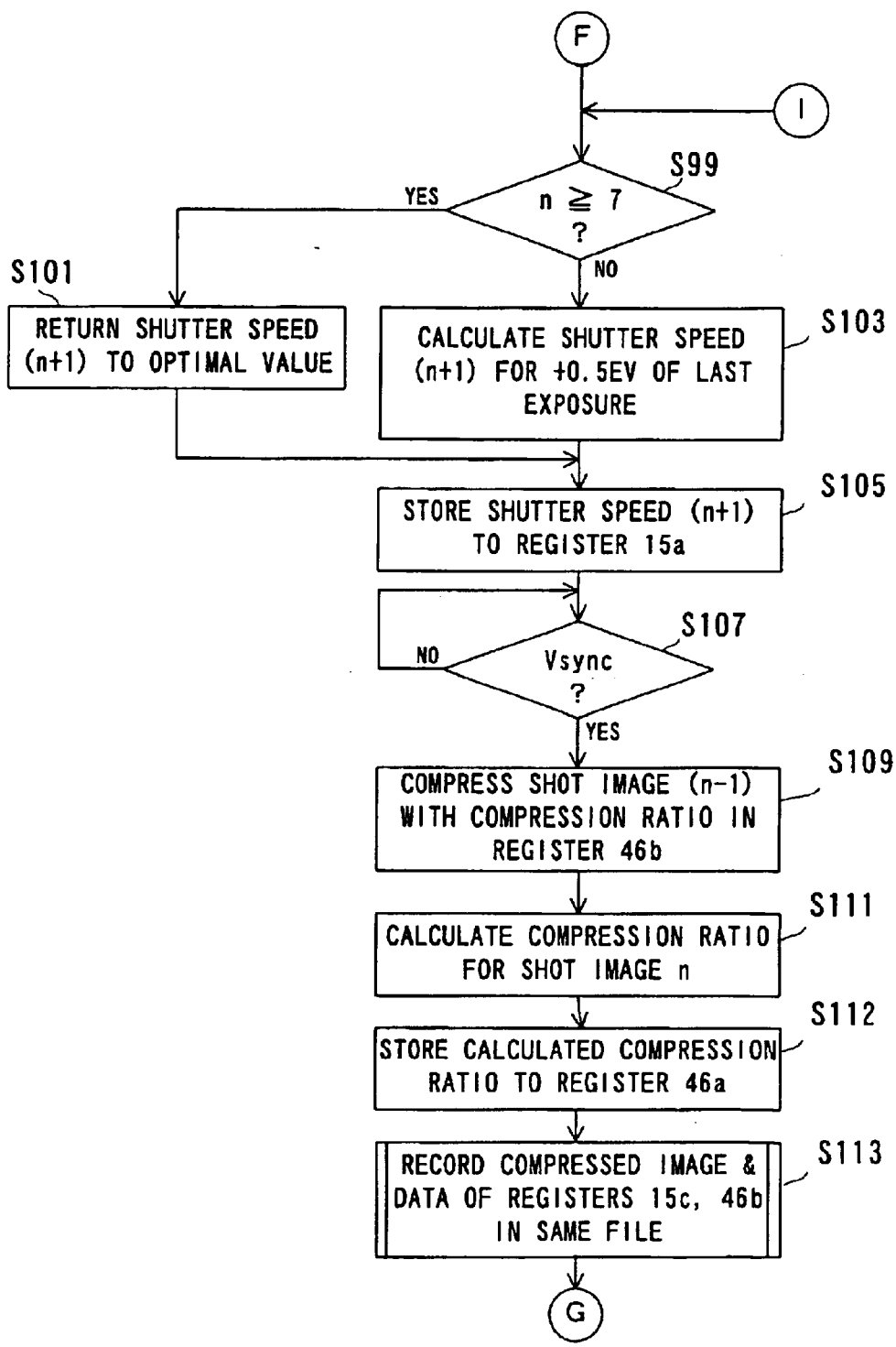
FIG. 12 is a flowchart showing still another part of operation in the FIG. 9 embodiment.

Referring to FIG. 9, a digital camera 10 of another embodiment is the same as the embodiment of FIG. 1 except that a register 15c is added and the CPU 46 processes a routine shown in FIG. 10 to FIG. 14. Accordingly, explanation will be omitted for duplications.

Figure 15:
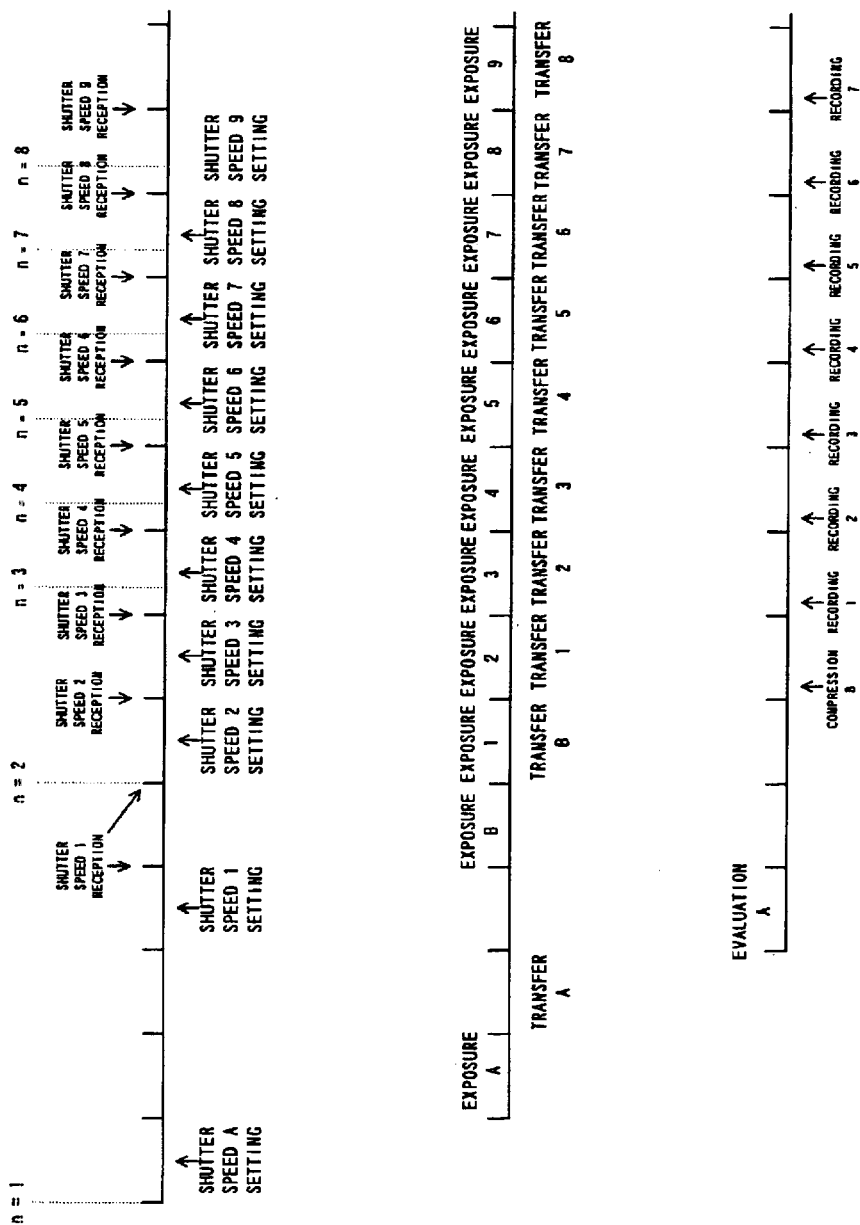
FIG. 15 is a timing chart showing one part of operation in the FIG. 9 embodiment.

As can be understood from FIG. 15, exposure for a current shot image is executed in a same frame as transfer of a preceding shot image. This advances exposure timing earlier than that of FIG. 1 embodiment. That is, in the FIG. 1 embodiment exposure is made at an interval of 2 frames, whereas in this embodiment exposure is at an interval of 1 frame. Nevertheless, this embodiment is same in the FIG. 1 embodiment in that the TG14 reads shutter speed data from the register 15a in response to a vertical synchronizing signal to effect exposure with this shutter speed and that the process from exposure to recording requires 3-frame period. As a result, the 3-frames required for processing a shot image includes overlapping of 2 frames. In other words, in a same frame are effected exposure for a succeeding shot image, transfer of a current shot image and recording of a preceding shot image.

In this manner, the timing of signal processing is different from that of the FIG. 1 embodiment. Hence, the CPU 46 processes a routine shown in FIG. 10 to FIG. 14. It is noted that steps S61–S81 are same as the steps S1–S21 shown in FIG. 3 and FIG. 4. By these processes, first an iris is set at an optimal value and a shutter speed 1 is calculated for −1.5 EV of an optimal exposure.

In step S83 the shutter speed data 1 is stored in the registered 15a and 15c. Then, if a vertical synchronizing signal is inputted twice, then in step S85 "YES" is determined. In step S87 a count value n of a counter 47 is incremented. Subsequently, in step S89 a shutter speed 2 is calculated for −1 EV of an optimal exposure, and in step S91 the shutter speed data 2 is stored to the registers 15a and 15b. Inputted by a vertical synchronizing signal once further, the CPU 46 in step S93 determines "YES" and the process proceeds to step S95.

After operating the shutter button 54, when a vertical synchronizing signal has been inputted totally seven times and "YES" has been determined in step S93, shot image data B obtained due to 5th-frame exposure B is stored in the SDRAM 38. Due to this, the CPU 46 in step 95 performs compression process on the shot image data B, and in step S97 calculates a compression ratio for use in a next-time compression process from a size of compressed image data B. The calculated compression ratio data is stored in step S98 to the registers 46a and 46b.

Incidentally, in step S95 the JPEG CODEC 45 is instructed the compression by an initial value Xb as stated before, and in step S97 a next-time compression ratio X1 is calculated according to Equation 1 stated before.

In step S99 it is determined whether a count value n is equal to or greater than "7" or not. If "NO", in step S103 is calculated a shutter speed (n+1) for +0.5 EV of a last-time exposure. On the other hand, if "YES", in step S101 the shutter speed (n+1) is returned to a speed for an optimal exposure. Then, in step S105 the calculated shutter speed data (n+1) is stored in the register 15a.

Incidentally, in first process of step S105, the shutter speed data is stored in the register 15a. The processes of this step S105 as well as the above step S83 and S91 store shutter speed data 3, 2, 1 into the registers 15a–15c. That is, consecutive 3 frames of shutter speed data are stored into the registers 15a–15c.

If a vertical synchronizing signal is inputted once, the CPU 46 in step S107 determines "YES". Because shot image data (n−1) is stored in the SDRAM 38, the CPU 46 in step 109 performs a compression on the shot image data (n−1) according to the compression ratio data in the register 46b. Further, in step S111 a next-time compression ratio is calculated based on a size of the compressed image data (n−1). In also this case, calculation is according to Equation 2 as above. The obtained compression ratio is stored in step S112 to the register 46a.

Figure 14:
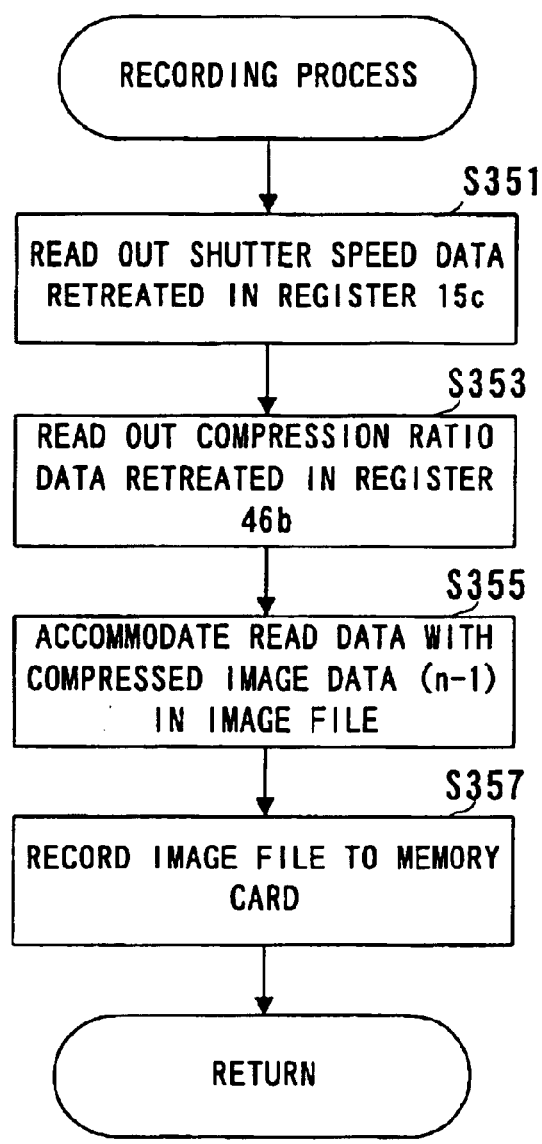
FIG. 14 is a flowchart showing another part of operation in the FIG. 9 embodiment.

In step S113 a subroutine shown in FIG. 14 is processed to record the compressed image data with relation to the shutter speed data stored in the register 15c and compression ratio data (n-31 1) stored in the register 46b. That is, the shutter speed data retreated in the register 15c is read out in step S351, and then the compression ratio data retreated in the register 46b is read out in step S353. Subsequently, the read respective data and compressed image data (n−1) are accommodated in same image file in step S355. Then, in step S357 this image file is recorded onto the memory card 50. In this manner, an image file accommodating therein the shutter speed data, compression ratio data and compressed image data is created within the memory card 50.

Figure 13:
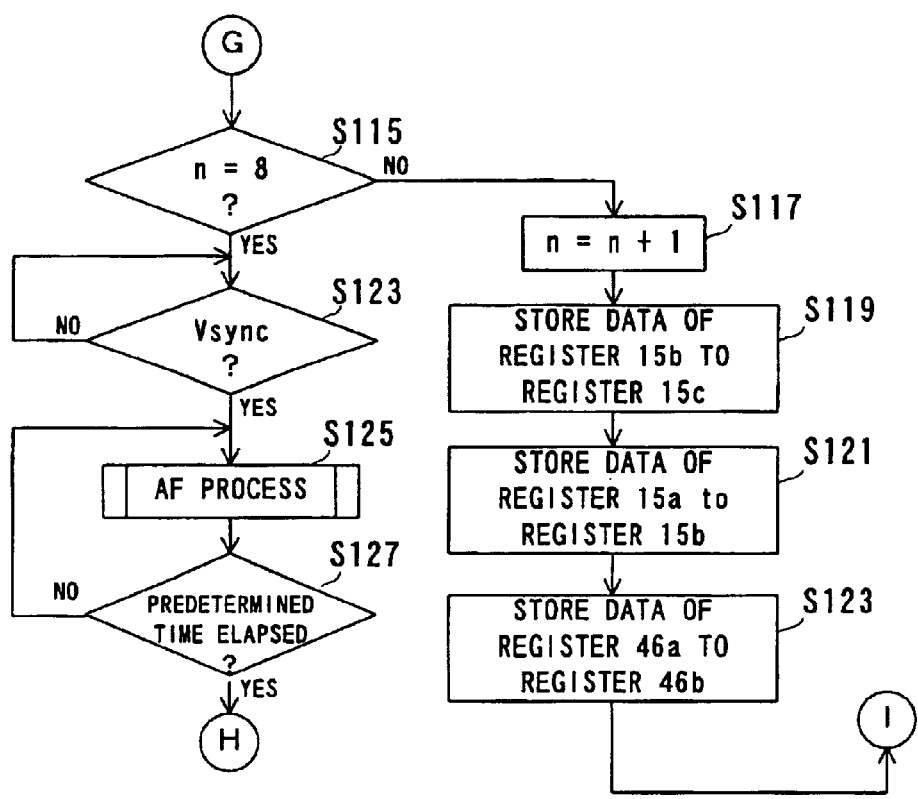
FIG. 13 is a flowchart showing further part of operation in the FIG. 9 embodiment.

The CPU 46 thereafter determines in step S115 of FIG. 13 whether the count value n is "8" or not. If "NO" here, then in step S117 the counter 47 is incremented. Subsequently, in step S119 the data of the register 15b is retreated in the register 15c, and in step S121 the data of the register 15a is retreated in the register 15b. Furthermore, in step S123 the data of the register 46a is retreated in the register 46b, thereafter the process returns to the step S99. That is, the shutter speed data in the register 15b is transferred into the register 15c, whereby in the next step S113 desired shutter speed data is written into an image file. Meanwhile, because the shutter speed data in the register 15a is transferred into the register 15b, there is no possibility that the shutter speed data be erased by a next-time process of the step S105. As for the compression ratio data, the data in the register 46a is transferred into the register 46b, whereby it is possible to compress with a desired compression ratio and record desired data. Furthermore, the current compression ratio data is prevented from being erased by the succeeding compression ratio data.

The respective ones of shutter speed data are shifted from the registers 15a, 15b into the registers 15b, 15c, and newly calculated shutter speed data is stored into the register 15a in the next step S105. Accordingly, consecutive predetermined 3 frames of shutter speed data are always secured within the registers 15a–15c.

Referring to FIG. 15, the shot image data stored in the SDRAM 38 is updated at a time interval of 1 frame. Due to this, in each frame there exists two shot images having not been recorded. For example, in a frame to be set by a shutter speed 5, a shot image 3 is under transfer and a shot image 4 is during exposure. Each shot image is subjected to a record process after 2-frame later from a start of exposure. Due to this, the shutter speed data stored in the register 15*a* is transferred into the register 15*c* by spending a 2-frame period, and thereafter accommodated within an image file. As a result, the related compressed image data, shutter speed data and compression ratio data are accommodated in a frame image file.

Figure 5:
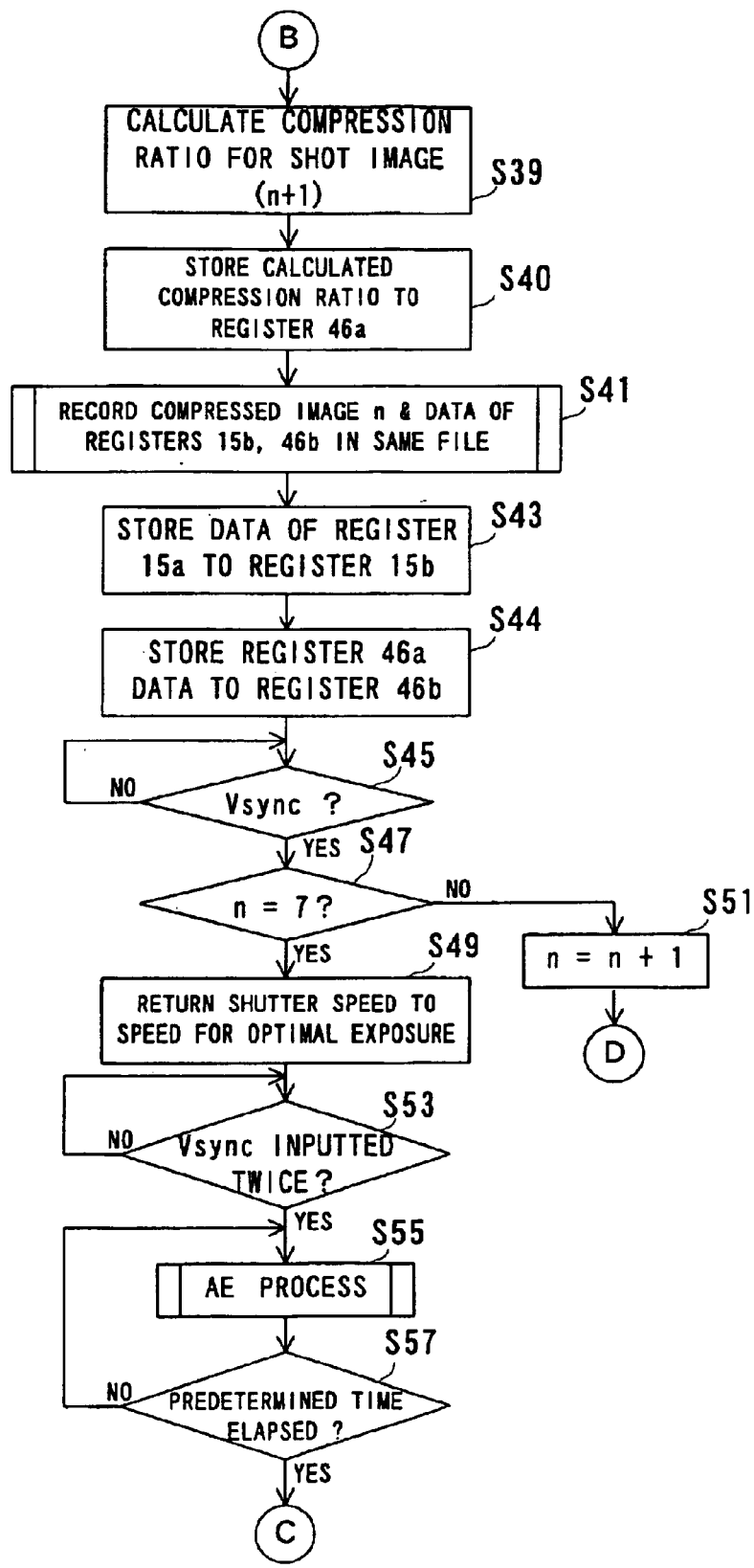
FIG. 5 is a flowchart showing still another part of operation in the FIG. 1 embodiment.

If the count value n is incremented up to "8", the CPU 46 in step S115 determines "YES". Waiting for once input of a vertical synchronizing signal, the CPU 46 enters into an AE process of step S125. In the FIG. 1 embodiment the AE process was entered after the shutter speed was returned to its optimal value and a vertical synchronizing signal was inputted twice. Contrary to this, in this embodiment, after the count value n reaches "7", the shutter speed is returned to an optimal value by steps S101 and S105. Furthermore, when the count value n assumes 8, the process moves from the step S115 to step S123. That is, in this embodiment a similar step to the step S49 of FIG. 5 is provided in a group constituted by the steps S99–S121.

In step S125 a similar AE process is conducted to that of FIG. 1 embodiment. The process returns to the step S61 after elapsing a predetermined period. The reason for conducting such an AE process for a predetermined period after completing a continuous shot process is same as that of the FIG. 1 embodiment.

It is noted that, because this embodiment explained the operation in a program AE mode, the iris during the continuous shot operation was fixed and the exposure was changed depending upon a shutter speed. It is however needless to say that the present invention is applicable also to a shutter speed preference mode wherein the iris is gradually changed with the shutter speed fixed.

Also, although in this embodiment exposure was controlled under an electronic shutter scheme, it may be controlled by a mechanical shutter scheme. Furthermore, although this embodiment used the CCD imager to shoot a subject image, a CMOS imager may be used in place of the CCD imager.

Furthermore, it is assumed in the continuous shot mode of this embodiment that a stationary subject is shot with different exposures to obtain at least one of a proper exposure of a shot image. That is, it is premised that the subject is stationary and the camera is also fixed. The continuous shot mode of this embodiment however is applicable to such a case that the subject is a moving body or changes due to camera panning. That is, the compression ratio during recording is changed for every shot image, without large change in compressed image data size. Accordingly, it is possible to properly record shot images even where there is movement in the subject.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for performing continuous shots of a subject with different exposures, comprising:
   a signal generator for periodically generating a timing signal;
   a first register for holding exposure data;
   a timing generator for causing exposure according to exposure data held in said first register in response to said timing signal;
   an instruction key for instructing a continuous shot operation; and
   a processor for starting to count said timing signal in response to an instruction of said instruction key, and performing an update process to update said exposure data held in said first register at a first predetermined timing specified by counting the timing signal.

2. A digital camera according to claim 1, further comprising an image sensor to create charges corresponding to a subject image, wherein said timing generator controls a charge storage period on said image sensor according to said exposure data held in said first register.

3. A digital camera according to claim 1, wherein said processor starting to count said timing signal in response to said instruction of said instruction key and performs a recording process to record shot image data obtained by said exposure at a second predetermined timing specified by counting the timing signal.

4. A digital camera according to claim 3, wherein said update process includes a first detecting process to detect said first predetermined timing based on said timing signal, a set process to set succeeding exposure data in said first register in said first predetermined timing, and a retreat process to retreat current exposure data from said first register to a second register prior to setting said succeeding exposure data; and said recording process including a second detection process to detect said second predetermined timing based on said timing signal, and a data recording process to record current shot image data obtained due to exposure according to said current exposure data and said current exposure data retreated in said second register in said second predetermined timing.

5. A digital camera according to claim 4, wherein said data recording process includes a compression process to compress said current shot image data, and a file creating process to create within a recording medium a current image file accommodating current compressed image data created by said compression process and said current exposure data.

6. A digital camera according to claim 5, wherein said processor further performs a calculation process to calculate a current compression ratio based on a preceding compression ratio upon compressing preceding shot image data and a data size of preceding compressed image data, and a storing process to store current compression ratio data representative of said current compression ratio into a third register, wherein said compression process performs compression on said current shot image data according to said current compression ratio data stored in said third register.

7. A digital camera according to claim 6, wherein said file creating process is to accommodate in said current image file said current compression ratio data stored in said third register in addition to said current compressed image data and said current exposure data.

8. A digital camera according to claim 1, wherein said processor performs an adjustment process of said exposure over a predetermined period after ending said continuous shots.

9. A digital camera which continuously shoots a subject with different exposures, comprising:
   a signal generator for periodically generating a timing signal;
   a first register for holding exposure data;
   a timing generator for periodically causing exposure according to the exposure data held in said first register, in response to the timing signal; and
   a processor for updating the exposure data held in said first register, at a first predetermined timing specified by counting the timing signal.

10. A digital camera according to claim 9, further comprising an image sensor to create charges corresponding to a subject image, wherein said timing generator controls a charge storage period on said image sensor according to the exposure data held in said first register.

11. A digital camera according to claim 9, wherein said processor records shot image data obtained by the exposure, at a second predetermined timing specified by counting the timing signal.

12. A digital camera according to claim 9, wherein said processor adjusts the exposure over a predetermined period after ending continuous shots.

* * * * *